Aug. 8, 1944.  H. M. PFLAGER  2,355,104
RAILWAY TRUCK STRUCTURE
Filed March 25, 1942  2 Sheets-Sheet 1
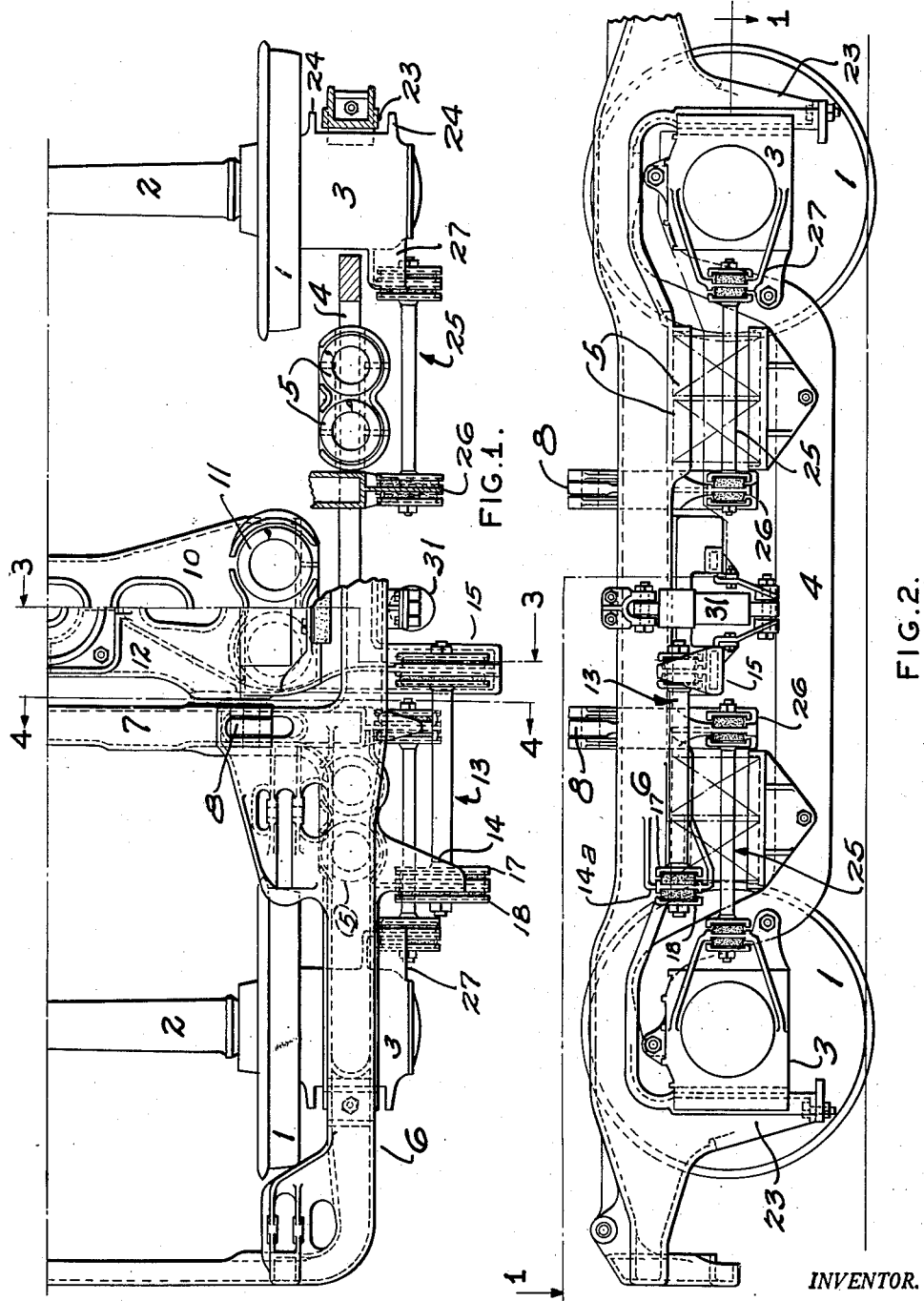
INVENTOR.
HARRY M. PFLAGER
BY
Rodney Bedell
ATTORNEY Aug. 8, 1944.　　　H. M. PFLAGER　　　2,355,104
RAILWAY TRUCK STRUCTURE
Filed March 25, 1942　　　2 Sheets-Sheet 2

*INVENTOR.*
HARRY M. PFLAGER
BY Rodney Bedell
*ATTORNEY*

Patented Aug. 8, 1944

2,355,104

UNITED STATES PATENT OFFICE 2,355,104

RAILWAY TRUCK STRUCTURE

Harry M. Pflager, St. Louis, Mo., assignor to General Steel Castings Corporation, Granite City, Ill., a corporation of Delaware Application March 25, 1942, Serial No. 436,181

7 Claims. (Cl. 105—190)

The invention relates to railway rolling stock, and more particularly to the assembly of the major parts of a truck such as a truck frame and bolster or the truck frame and journal boxes including anchor rods or tie rods connecting such parts to each other for transmitting forces between the parts and for providing resistance to movement of the parts in a direction transversely of the rod.

Previous anchor rod arrangements correspond generally in construction and in function to those disclosed in Reissue Patent No. 21,987, issued December 30, 1941, to V. L. Green and in the copending application of C. E. Tack, filed September 16, 1938, Serial No. 230,175, now Patent No. 2,290,779, issued July 21, 1942, and these rods are provided with circular rubber pads at the end portions of the rod, which pads are interposed between brackets on the corresponding truck part and washers or collars on the rods. These rods transmit forces exerted longitudinally of the rod between the connected truck parts by direct thrust on the pads and offer resistance to forces tending to move the connected parts relative to each other transversely of the rod when the rods become inclined from their normal axes and due to the resulting distortion of the pads. A circular rubber pad provides a uniform resistance in any direction transversely of the rod.

In the ordinary truck, certain truck parts have movements relative to each other in more than one direction and such parts, as the frame and journal box or the frame and bolster, usually have a greater amount of relative vertical movement than lateral movement and it is desirable that there be less resistance to relative vertical movement than to lateral movement of such parts. It is also desirable that such relative movement of the parts be accomplished without any sliding engagement between them to reduce frictional wear and to eliminate as much as possible the direct transmission of shocks and vibrations between them so that a minimum amount of such shocks and vibrations are carried to the car body.

The main object of the present invention is to provide anchor rods or draft rods between the journal boxes and truck frame and between the bolster and truck frame or between any two other truck parts so that forces transmitted between the parts longitudinally of the rod will permit only a slight movement due to the distortion of the rubber under compressive resistance and so that forces tending to move the parts relative to each other in one direction transversely of the rod will be resisted by the distortion of the rubber and provide less resistance to such movement in that direction than in another direction transversely of the rod. This is accomplished by providing anchor rods with pads of rubber-like material in which the pads have a non-circular contour such that the dimension across the pad is greater in one direction than in another direction. When the anchor rod is applied between the journal box and frame or between the bolster and frame, there will be less resistance to relative vertical movement of the parts than to relative transverse movement of the parts.

It is another object of the present invention to provide a single anchor rod, between two truck parts or between the corresponding ends of two truck parts, so arranged that the pads of rubber-like material offer a greater amount of resistance to relative movement of the parts in one direction transversely of the rod than in another direction transversely of the rod so that the movement in the latter direction will be a substantially free movement and so that it will not be necessary to provide a plurality of rods or other resisting means between the truck parts to have the desired resistance to movement in the direction other than the direction of free movement.

These and other detail objects of the invention are attained by the structure illustrated in the accompanying drawings, in which—

Figure 1 is a top view of one longitudinal half of a four wheeled truck with portions of the truck frame broken away and sectioned horizontally, as indicated in the line 1—1 in Figure 2, to more clearly illustrate the construction.

Figure 2 is a side elevation of the truck shown in Figure 1.

Figure 3:
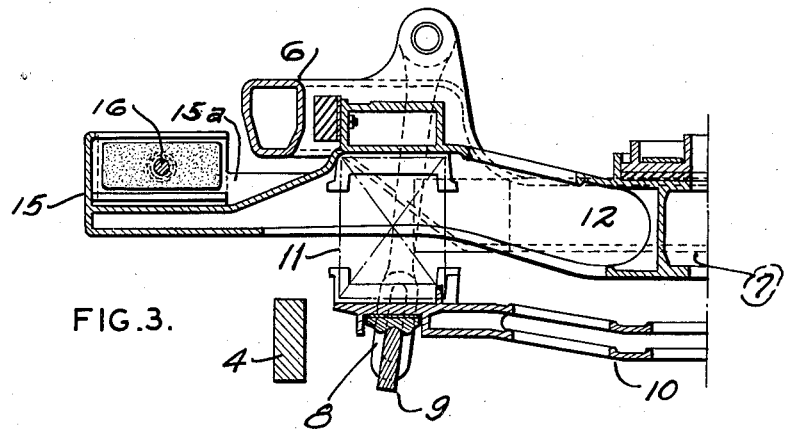
Figures 3 and 4 are vertical transverse sections taken on the corresponding section lines of Figure 1.
Figure 4:
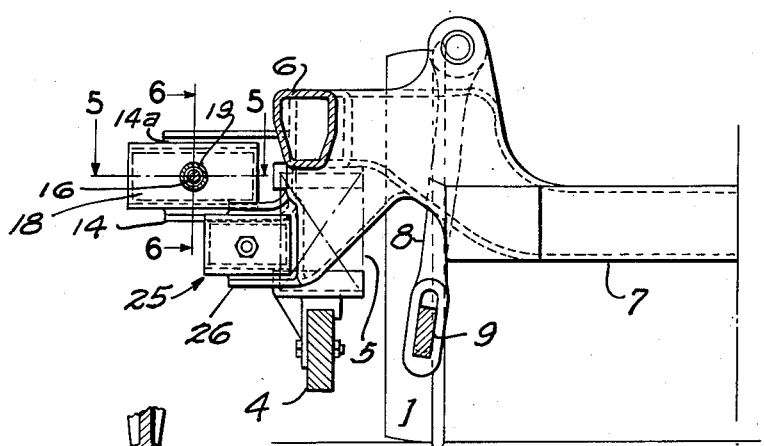

The truck wheels 1 and axles 2 carry the journal boxes in the usual manner. Equalizers 4 extend between journal boxes at the same side of the truck and mount the truck springs 5 which support the truck frame 6 and provide for vertical movement of the frame relative to the axles and journal boxes. The frame includes transverse transoms 7. Swing hangers 8 are pivotally suspended from the end portions of transoms 7 and carry the cross bars 9, the spring plank 10 and the bolster springs 11 which support the bolster 12 for lateral movement relative to the truck frame in a well understood manner.

The bolster is positioned between transoms 7 and, to resist the movement of the bolster longitudinally of the truck relative to the truck frame and to prevent the sides of the bolster and transoms from pounding and sliding along each other, there is provided at each end of the bolster a draft rod or anchoring device indicated generally at 13 extending between brackets 14 and 15 on the frame and bolster respectively. Each of the brackets includes an upright flange 14a, 15a extending transversely of the truck. The anchoring device includes a rigid rod 16 extending through flanges 14a and 15a and mounting a pair of rectangular collars 17 and 18 at each end. A tubular spacer 19 holds the inner collars 17 a fixed distance apart. Similarly rectangular pads 20, of rubber-like material, conforming in outline to the collars, are placed between these collars and flanges 14a and 15a and a nut 21 on the adjacent end of the rod clamps the adjacent collars and pads against the flange between them. Adjustable fillers or shims 22 may be inserted between each pad and the adjacent collar.

The truck frame has a depending leg 23 at the outer side of each journal box serving as a safety device preventing the spreading of the axles and cooperating with the box flanges 24 (Figure 1) to limit the movement of the box and frame relative to each other transversely of the truck. Each box is yieldingly held in its normal relation to the truck frame by an anchoring device 25 constructed similar to that previously described but having its end portions secured to upright flanges on corresponding brackets 26 and 27 on the frame and box respectively.

The anchoring devices 13 and 25 correspond generally in construction and in function to those disclosed in the above mentioned Green patent and Tack patent except that the rectangular contours of the rubber pads and rod collars provide a substantially greater dimension of these parts transversely of the truck. Hence the yielding resistance offered by the anchoring devices to the relative movement of the connected truck parts, transversely of the rods, will be comparatively large in the same direction of the greatest dimension of the pads and collars, and will be comparatively small in the same direction of the smaller dimension, and these two dimensions of the pads may be varied to provide the desired amount of resistance.

In other words, the anchoring devices will not substantially interfere with the action of the truck springs and bolster springs, although cooperating with telescoping shock absorbers 31 to dampen oscillations of these springs, but will offer sufficient resistance to relative lateral movements of the connected parts to keep the parts centered and will cushion and resist lateral shocks. The anchoring devices prevent the transmission of vibrations, shocks and other forces directly between the interconnected parts and avoid sliding contact between these parts, thereby eliminating wear and avoiding replacements because of wear.

Figure 5:
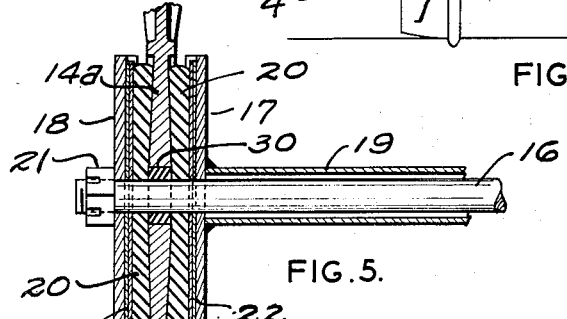
Figures 5 and 6 are detail horizontal and vertical sections respectively taken on the corresponding section lines of Figure 4 and drawn to an enlarged scale.
Figure 6:
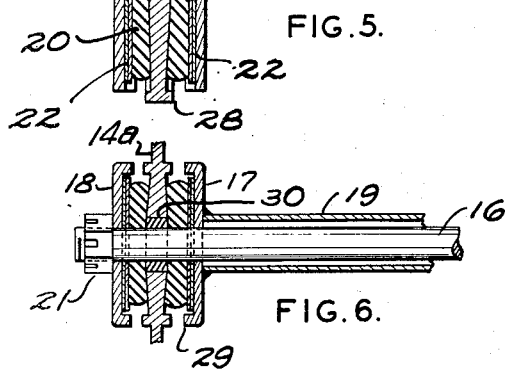

Preferably the opposing faces of the flanges and rubber pads are concavo-convex, as best shown in Figures 5 and 6, and the flanges and collars have lips 28 and 29 respectively to properly position the devices along the flanges. Bushings 30, of yielding material, applied to the rods 16 where they pass through the flanges, will serve the same purpose and prevent metal to metal contact between the interconnected parts.

It will be understood that the ratio between the longest dimension and the shortest dimension of the collars and pads may be other than as shown and that the angular extension of these greater and lesser dimensions about the longitudinal axis of the rod 16 may be changed as may be desired to afford different degrees of resistance in different angular planes without departing from the spirit of the invention, and the exclusive use of such modifications as come within the scope of the claims is contemplated.

What is claimed is:

1. In a railway truck having a truck frame and a journal box movable relative to said frame vertically and laterally of the truck, an elongated rigid member with pivotal connections at its opposite ends to said frame and journal box respectively, at least one of said connections including a clamp with at least one jaw comprising a rubber-like element yieldingly resisting relative movement of said frame and journal box longitudinally of the truck, by distortion of said element, and providing for but yieldingly resisting relative movements of said frame and journal box vertically and transversely of the truck by distortion of said element when said member becomes inclined from its normal axis, said connections and element having substantially flat opposing surfaces of greater width than height so as to offer greater resistance to relative movement of said frame and journal box transversely of the truck than to relative movement of said frame and journal box vertically of the truck.

2. In a railway truck, a frame having a rigid substantially flat flange extending transversely of the truck, a bolster movable laterally of the truck having a corresponding substantially flat flange similarly disposed, a rigid draft arm with its end portions extending through said flanges and having opposed substantially flat collars on each side of each of said flanges, there being substantially flat rubber pads between each of said collars and the adjacent flange, whereby longitudinal forces in opposite directions are transmitted between said bolster and frame through said rubber pads and arm, and said bolster and frame may be moved vertically and transversely of the truck relative to each other because of the yielding of said pads to allow inclination of said arm from its normal axial position, said pads and collars extending from said arm transversely of the truck a substantially greater distance than they extend vertically of the truck, whereby the relative movement of the bolster and frame transversely of the truck is resisted to a substantially greater extent than the relative movement of the bolster and frame vertically of the truck.

3. In a railway truck, a frame and another truck part movable relative to each other transversely of the truck, a rigid member extending longitudinally of the truck and terminating at each end in a pair of substantially flat collars spaced apart longitudinally of the truck, a rigid substantially flat element of said truck part extending between one pair of said collars, a rigid substantially flat element of said frame extending between the other pair of said collars, and a substantially flat rubber pad between each of said collars and the adjacent element, said member and pads transmitting forces exerted longitudinally of the member between the frame and truck part and yieldingly relative movement of said frame and truck part laterally of the member, the rubber pads being of general rectangular shape transversely of the rigid member with their greater length disposed transversely of the member in one direction and with their shorter width disposed vertically of the member in another direction.

4. In a railway truck, a frame, a bolster, a rigid draft arm having a connection at one end to said bolster and extending therefrom longitudinally of the truck and having a connection at its other end to the frame, each of said connections comprising a pair of substantially flat collars on the draft arm provided with opposing substantially flat rubber pads gripping between them a flange on the adjacent truck part, said pads and flange having contact with each other transversely of the truck for a greater distance than their contact with each other vertically of the truck so that a longitudinal force will be transmitted between the bolster and frame through said arm while the pads may yield with increasing resistance to accommodate relative lateral and vertical movement of the bolster and frame and to return the bolster and frame to normal relative position, the resistance to the relative lateral movement of the bolster and frame being substantially greater than the resistance to the relative vertical movement of the bolster and frame.

5. In an anchor device of the class described for holding two relatively movable truck parts in spaced relation, an elongated member having devices at its opopsite ends for pivotal connection to said parts, at least one of said devices including substantially parallel, flat, opposing elements extending transversely of the member and arranged to be associated with the member and part respectively, and a pad of yielding material between said elements and subject to compressive thrust from said elements substantially throughout its area to resist movement of the parts relative to each other longitudinally of the member and subject to pressure throughout that portion of its area at one side of the member when the parts move relative to each other transversely of the member and thereby incline the member from its normal axis, said elements and pad being wider in one direction transversely of the member than in another direction transversely of the member so that the resistance of the resilient pad to inclination of the member from its normal axial position is greater in the one direction than in the other direction.

6. In a railway truck with relatively movable parts, an elongated member with pivotal connections at its opposite ends to said parts respectively, at least one of said connections including substantially flat elements clamping a truck part between them, one elment comprising a substantially flat pad of rubber-like material yieldingly resisting relative movement of said parts longitudinally of said member and providing for but yieldingly resisting relative movement of said parts transversely of said member by distortion of said pad when said member is inclined from its normal axis, said pad having a greater dimension in one direction transversely of the member than in another direction transversely of the member so as to offer greater resistance to relative movement of said parts in the first-mentioned direction than in the second-mentioned direction.

7. In a railway truck having a main frame member and a bolster member movable relative to each other vertically and laterally of the truck, an elongated anchoring device with pivotal connections at its opposite ends to said members respectively, at lease one of said connections including substantially flat elements associated with the device and corresponding member and a similarly shaped flat pad of rubber-like material clamped between said elements and subject to compressive thrust substantially evenly throughout its area to resist relative movement of said members longitudinally of the device, movement of said members vertically and transversely of the truck being resisted by said pad yielding throughout the area at one side of the member to thrust applied thereto by the inclination of the member from its normal axis, said elements and pad being of greater width transversely of the truck than vertically of the struck so as to offer greater resistance to the relative movemetn of said members transversely of the truck than to their relative movement vertically of the truck.

H. M. PFLAGER.